United States Patent [19]

Thelen et al.

[11] Patent Number: 5,038,612
[45] Date of Patent: Aug. 13, 1991

[54] ULTRASONIC MEASURING DEVICE

[75] Inventors: Wolfgang Thelen; Wolfgang Lorenz; Klaus Templin; Joachim Lohr, all of Berlin, Fed. Rep. of Germany

[73] Assignee: Krone AG, Berlin, Fed. Rep. of Germany

[21] Appl. No.: 450,626

[22] Filed: Dec. 14, 1989

[30] Foreign Application Priority Data

Feb. 25, 1989 [DE] Fed. Rep. of Germany ... 8902375[U]

[51] Int. Cl.⁵ ............................................. G01P 1/02
[52] U.S. Cl. .................................... 73/493; 73/866.5; 73/632; 367/91; 367/165
[58] Field of Search ............... 73/493, 866.5, 431, 73/632; 367/188, 89, 90, 91, 162, 165, 173, 176; 310/334

[56] References Cited

U.S. PATENT DOCUMENTS 3,583,677  6/1971  Phillips ................................. 367/162
4,728,954  3/1988  Phelan et al. ......................... 367/91
4,942,765  7/1990  Hiniker et al. ........................ 43/493

Primary Examiner—Hezron E. Williams
Assistant Examiner—Rose M. Finley
Attorney, Agent, or Firm—McGlew & Tuttle

[57] ABSTRACT

An ultrasonic measuring device for determining motion parameters of moved bodies, in particular path, speed, acceleration, slip and the like, comprising first and second ultrasonic transducers supported in a housing. Each of the ultrasonic transducers (transmitter and receiver) having either a sound generator or a sound receiver positioned between two vibrating elements. A connecting element clamps a sound generator with a sound receiver between the vibrating elements. Each of the ultrasonic transducers being supported by support elements featuring bent-off portions arranged in a meander-type manner in turn (bent back upon itself) in the housing. One of the support elements, for each transducer, is arranged at the sound opening of the housing and is slidably mounted on a vibrating element.

14 Claims, 5 Drawing Sheets

ULTRASONIC MEASURING DEVICE

FIELD AND BACKGROUND OF THE INVENTION

The invention relates to an ultrasonic measuring device for determining motion parameters of bodies in motion, in particular path, speed, acceleration, slip or the like. The device comprises two ultrasonic transducers (transmitter and receiver) supported in a housing and composed each of one sound generator and one sound receiver, two vibrating elements and a connecting element securely clamping one of the sound generator and the sound receiver between the vibrating elements. The sound generator includes a quartz crystal, in particular one formed of piezoceramics for a piezo-electric measuring method.

A measuring device with similar general features is known from U.S. Pat. No. 4,506,353. It serves for automatic measurements of speed and path of a mobile element, in particular for the automatic track guiding of a vehicle. For this purpose, there are installed, at the vehicle bottom at a distance corresponding to the vehicle width, two measuring devices each comprising two ultrasonic transmitters and receivers aligned in a longitudinal direction of the vehicle inclined at different angles to the roadway. The ultrasonic transducers are connected to a calculator unit forming control values for the steering drive of the vehicle from the measured values and from the desired values. The measuring device is, however, not described in more detail in its specific construction.

It is known, however, that ultrasonic transducers do transfer sound not only to the air, but also to the housing in which they are accommodates. The sound in the housing is, by a multiple, higher than the sound coming back from the air to the receiver. This leads to faulty results.

SUMMARY AND OBJECTS OF THE INVENTION

It is an object of the invention to provide the ultrasonic measuring device of the mentioned species such that the transmission of ultrasonic waves generated by the ultrasonic transducers, in particular by the transmitter, to the housing is prevented.

For attaining this object, the invention provides that each ultrasonic transducer is supported by a means of support elements, bent-off in a meander-type manner, in the housing. The support elements are arranged at the sound exit opening or the sound entrance opening of the housing slidably mounted on a vibrating element. This arrangement provides that ultrasonic signals transmitted by the transmitter/ultrasonic transducer and received by the receiver/ultrasonic transducer are not transmitted to the housing, in which the ultrasonic transducers are accommodated. This is achieved by the meander-type bending-off of the support elements and by the slidable mounting of the one support element on the respective vibrating element. Each ultrasonic transducer is fixed at the housing only with its support element being bent-off in meander-type manner, which is disposed opposite to the sound exit or entrance opening. The other support element allows for free mobility of the ultrasonic transducer in its axial direction in the area of the sound exit or entrance opening.

The support elements bent-off in a meander-type manner are formed of disk-type wall portions extending radially and of two sleeve-type wall portions extending in a parallel manner, at the free ends of which follow support flanges. The wall portions have relatively thin wall thicknesses reducing the sound. Additional damping is achieved by the sharp-edged, meander-shaped bends of the support elements. Simultaneously, the support elements hold the ultrasonic transducers tightly in the housing and also fix them in the sound direction. The support flanges of the support elements are provided with circumferential recesses for receiving O-rings, which seal the support elements against the transducers and against the housing with respect to external influences.

The construction of the ultrasonic transducers each with one sound generator, two vibrating elements and a connecting element securely clamping the sound generator between the vibrating elements is considerably improved, according to a further embodiment, by the application of a set of cup springs, which guarantee the contact between the individual components, and, thus, proper transmitting or receiving, is achieved. By means of the set of cup springs, a biasing at 2,000 kp is possible. Thereby, the different thermal extensions, existing in operation due to the generated heat, will be compensated in especially favorable manner.

The housing comprises, in another novel embodiment, hopper-shaped exit or entrance openings, for the sound waves. The edge sections of the openings are provided with radii. Thus, the sound waves can be coupled in particularly favorable manner over the ultrasonic transducers directly to the air, without deflections being generated leading to inaccurate results.

Finally, the elevated temperature of 50° C. as compared to the ambient temperature, which is generated when operating the transmitter or ultrasonic transducer, resp., is compensated by a cooling member attached to the transmitter/ultrasonic transducer. In order to secure proper reception even with low temperatures (below 0° C.), the receiver/ultrasonic transducer is heated by means of a heating element, in particular of a (Positive Temperature Coefficient) PTC.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DESCRIPTION OF THE PREFERRED EMBODIMENT

Figure 1:
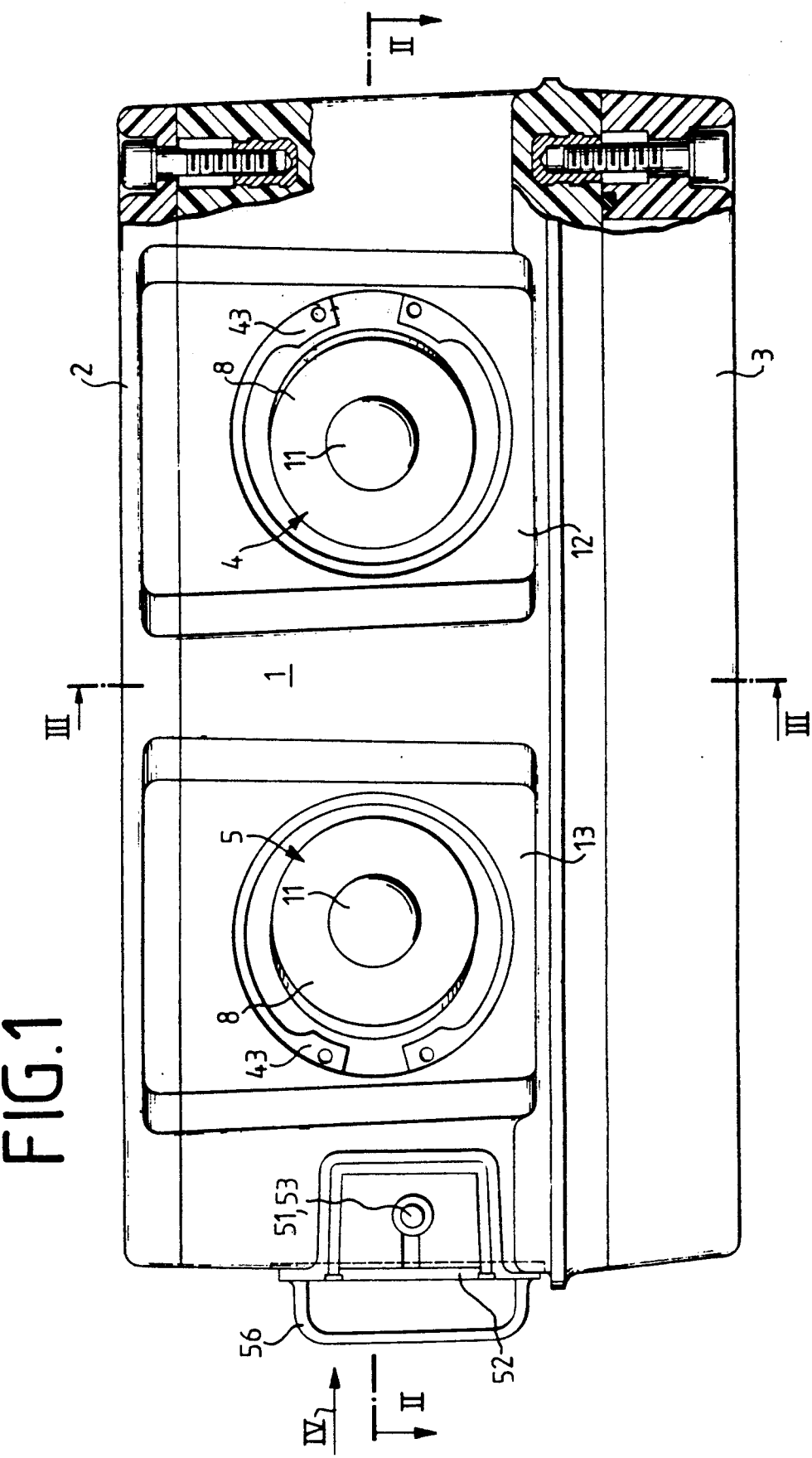
FIG. 1 is a view of the exit and entrance openings of the ultrasonic measuring device.

Referring to the drawings in particular, the invention embodied therein includes a housing 1 with upper housing cover 2 and lower housing cover 3. In the housing 1, an ultrasonic transducer 4 operating as a transmitter and an ultrasonic transducer 5 operating as a receiver are provided such that the longitudinal axes 49 thereof extends under an acute angle with respect to each other in a direction toward the hopper-shaped sound exit opening 12 or entrance openings 13 each formed with radii 57.

Each ultrasonic transducer 4, 5 consists of two disk-type sound generators or sound receivers 6 or 7, respectively which are clamped between two vibrating elements 8, 9. For clamping, sound generator 6 or sound receiver 7 and the vibrating elements 8, 9 are formed in disk-type manner and are mounted on cylindrical screws 10. The screw heads 11 are arranged in the sound exit opening 12 or in the sound entrance opening 13 and are provided with end caps 58. Between the vibrating elements 8, 9 and the adjacent sound generators 6 or sound receivers 7, respectively contact disks 14 are disposed, the central one of which is provided with a contact lug 15. An insulating sleeve 16 isolates the sound generators 6 or sound receivers 7 with respect to the cylindrical screw 10. On the cylindrical screw 10, a receiving ring 17 is mounted on the interior side of the housing 1, said ring bearing a set of cup springs 18, which can be tensioned by means of reducing disk 19 over a nut 20 to be screwed on the cylindrical screw 10. In this manner, a biasing force of approximately 2,000 kp can be exerted, by means of which the sound generators 6 or sound receivers 7, are clamped between the vibrating elements 8, 9.

The outside contact disks 14 of each ultrasonic transducer 4, 5, respectively are provided with contact lugs 21. The contact lugs 15 and 21 are connected to the wires of two-wire cables 22, which are guided to a printed-circuit board 23 provided with components and arranged in the lower housing section 3. The receiving ring 17 of the transmitter/ultrasonic transducer 4 is additionally provided with a PTC thermal sensor 24, which is also connected over cable wires, not shown in detail, to the printed-circuit board.

Each ultrasonic transducer 4, 5 is supported in the housing 1 by means of support elements 25, 26 bent-off in a meander-type manner (reverse direction). Each support element 25, 26, bent-off in a meander-type manner, is formed as one piece from two thin-walled, sleeve-type wall portions 27, 28 extending in parallel to the longitudinal axis of the ultrasonic transducer 4, 5 and a radially extending, thin-walled, disk-type wall portion 29 connecting the wall portions 27, 28 and radial support flanges 30, 31, 32 and 33 attached to the free ends of the sleeve-type wall portions 27, 28. The thin-walled, sleeve-type wall portions, 27, 28 of the one support element 26 have approximately equal lengths, whereas the thin-walled, sleeve-type wall portions 27, 28 of the other support element 25 have different lengths. Thus, the interior sleeve-type wall-portion 28 of the support element 25 is approximately twice as long as the outer sleeve-type wall portion 27 of the support element 25. The support elements 25, 26 hold the ultrasonic transducers 4, 5 in the housing 1 and fix them in their direction. Simultaneously, a considerable damping of the sound is achieved by the thin-walled, meander-type shape of the wall portions 27, 28, 29 and their sharp-edged bends.

The two outer support flanges 30, 32 of the support elements 25, 26 are provided with recesses for O-rings 34 fulfilling a sealing function. The interior support flanges 31 of the support elements 26 comprise three recesses each for O-rings 35. Finally, the interior support flange 33 of the support elements 25 is provided with a recess for an O-ring 36, which is slidable in a sealing manner on the outer peripheral surface of the outer vibrating element 8 of the ultrasonic transducers 4, 5.

Each ultrasonic transducer 4, 5 is supported by means of its support element 26 at one end tightly in the housing 1. For this purpose, end pieces 37 are screwed on the cylindrical screws 10. The end pieces clamp the interior support flanges 31 of the support elements 26 against the support disks 38 and are slid on the free ends of the cylindrical screws 10. The support disks rest against the screwed-on nuts 20. The end piece 37 of the transmitter/ultrasonic transducer 4 is provided with a cooling member 39 arranged outside the housing 1, and is surrounded by a bellows 40 clamped between the outer support flange 34 of the support element 26 and another bearing ring 41 being fixed toward the outside of the housing 1 by means of a Seeger ring 42. Corresponding Seeger rings 43 are disposed in the area of the sound exit opening 12 and of the sound entrance opening 13 for fixing the outer flanges 32 of the support elements 25.

Figure 2:
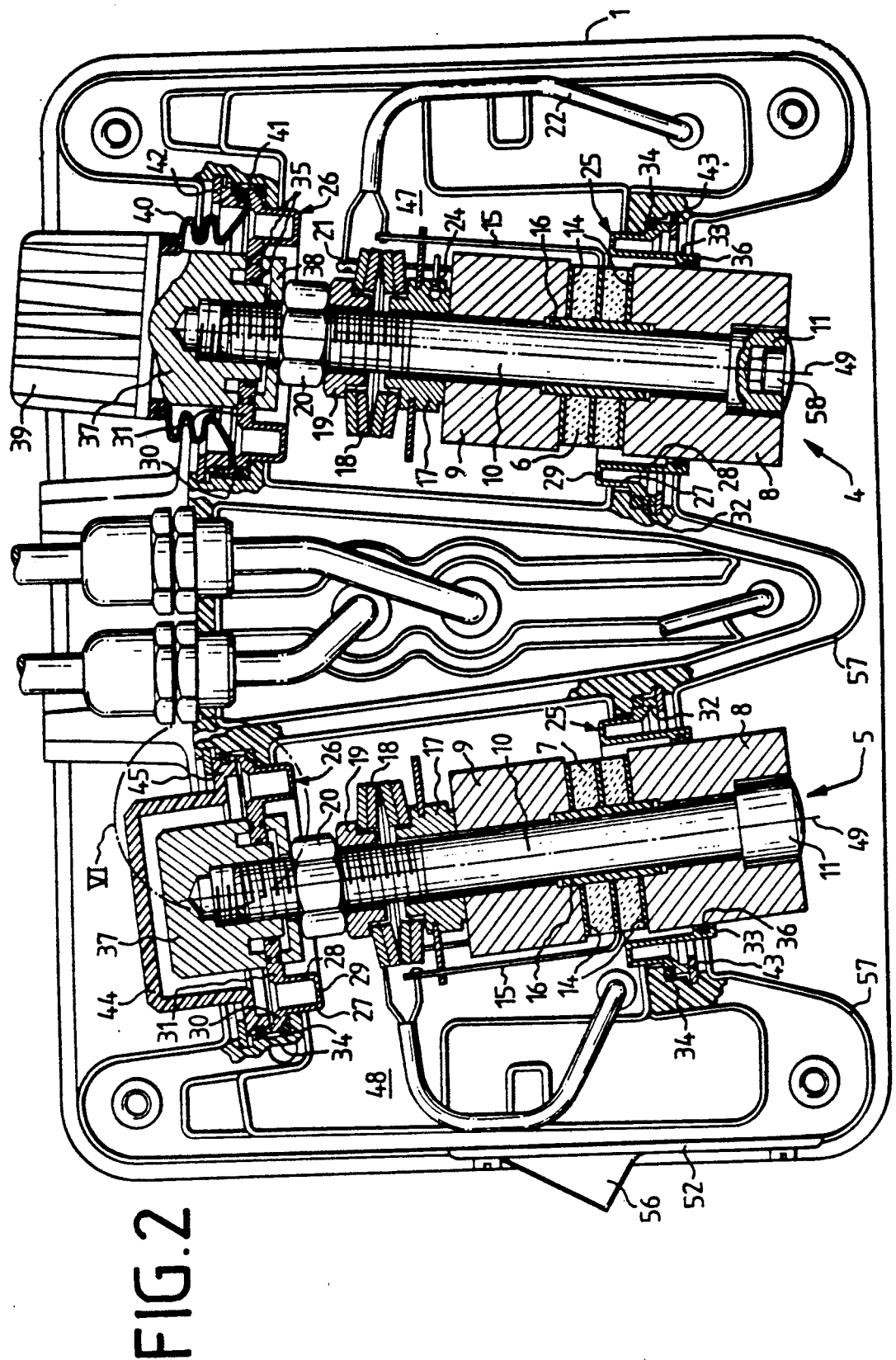
FIG. 2 is a cross-sectional view taken in the direction of line II—II in FIG. 1 through the central plane of the ultrasonic transducers.
Figure 3:
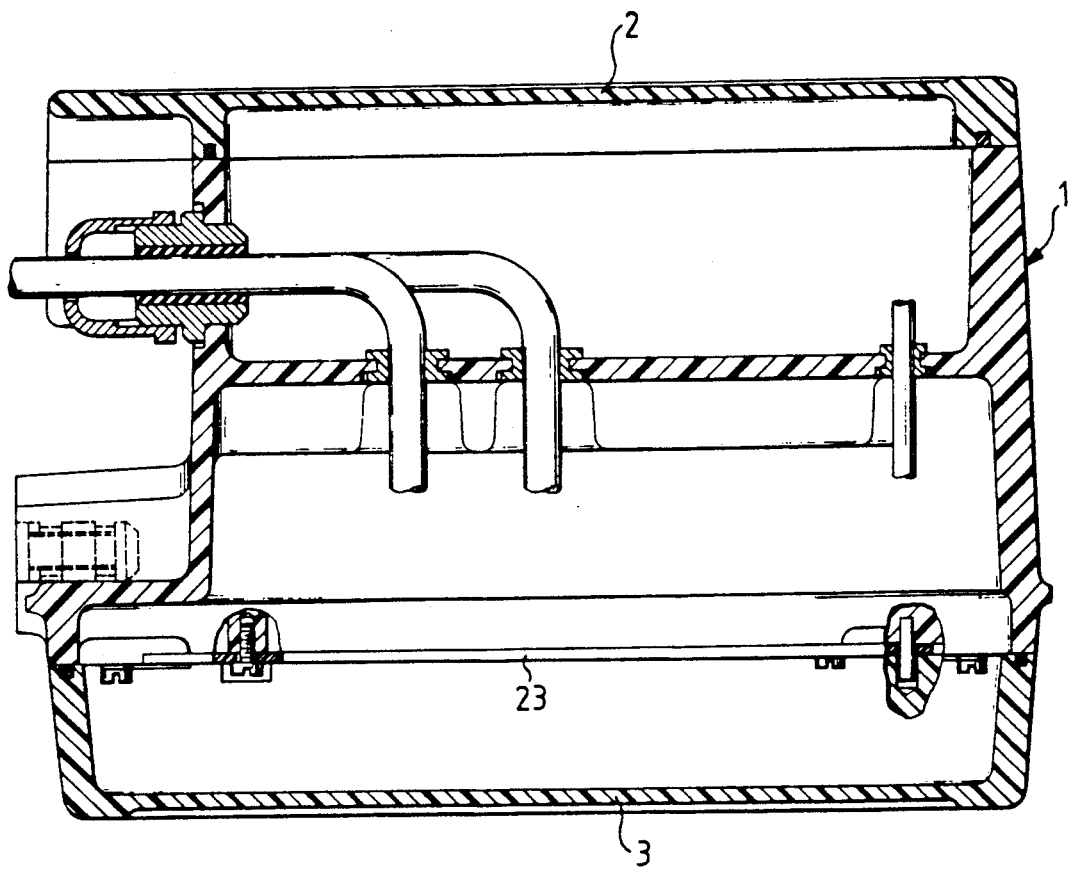
FIG. 3 is a cross-sectional view taken in the direction of line III—III in FIG. 1.
Figure 4:
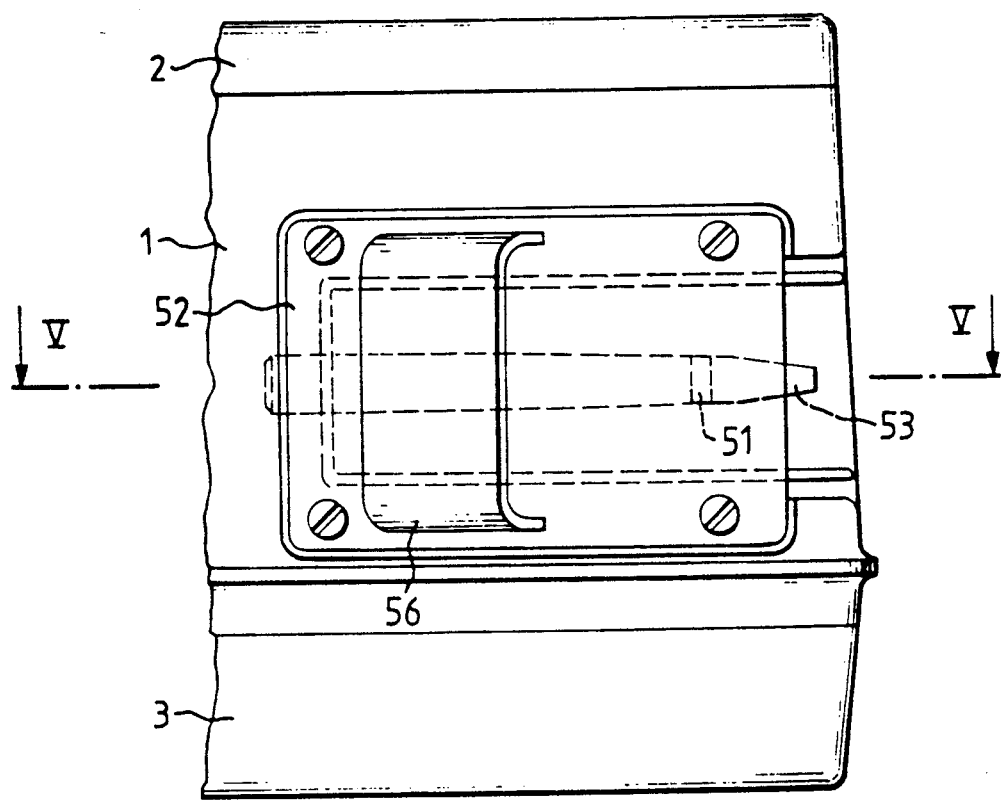
FIG. 4 is an end view viewed in the direction of arrow IV in FIG. 1.
Figure 5:
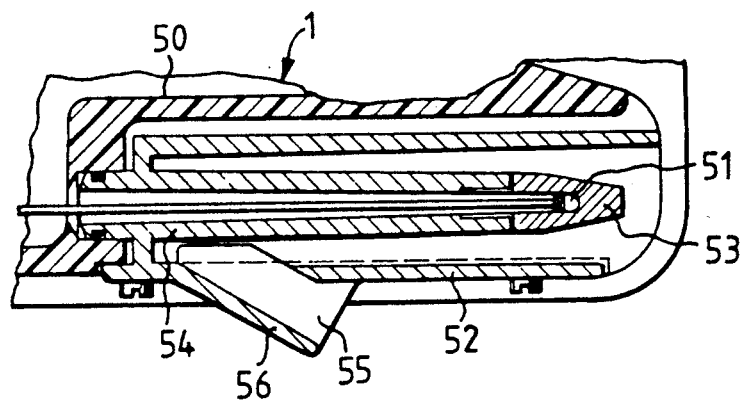
FIG. 5 is a partial cross-sectional view taken in the direction of line V—V in FIG. 4.
Figure 6:
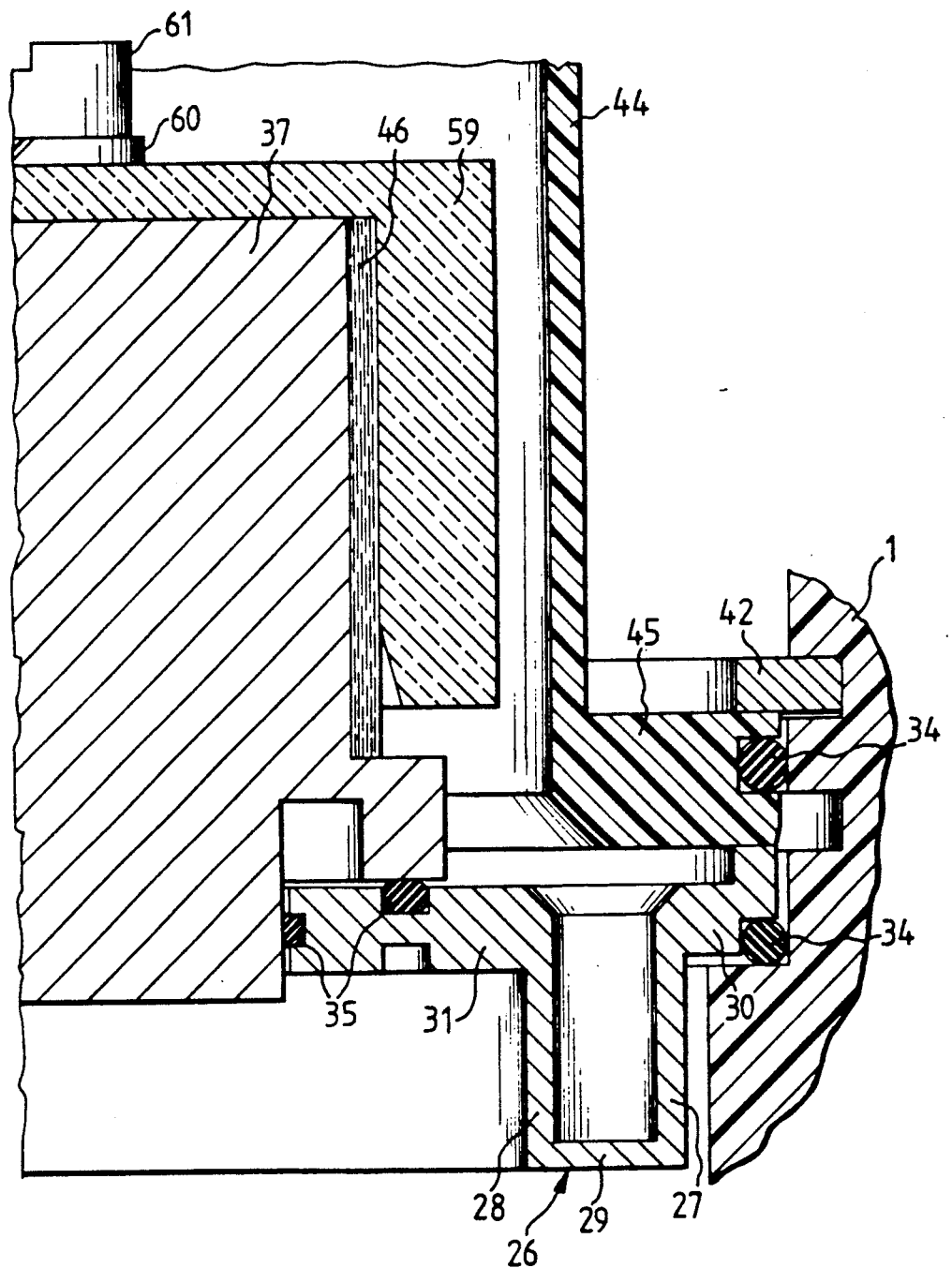
FIG. 6 is an enlarged view of detail VI of FIG. 2.

The end piece 37 of the receiver/ultrasonic transducer 5 is surrounded by a cap 44 clamped with its flange 45 between a Seeger ring 42 fixed in the housing 1 and the outer flange 30 of the support element 26. In the area of the cap 44, a heating element 46, in particular a PTC heating element, is disposed serving for heating the receiver/ultrasonic transducer 5 at temperatures below the freezing point. As shown in FIG. 6, the heating element 46 (not shown in FIG. 2) and comprising several small PTC plates surrounds the end piece 37 and is fixed by means of a slid-on clamping cap 59 fixed by means of a nut 61 and a lock washer 60.

In a side wall of the housing 1, a cutout 50 is provided for an NTC (Negative Temperature Coefficient); thermal sensor 51 inserted into a protective hood 52 and provided with a sound-damping unit 53 at the front end. The protective hood 52 is formed in box-type manner and comprises a central tube-type part 54 into which the NTC thermal sensor 51 is inserted. The air space surrounding the central tube-type part 54 serves for flow about the NTC thermal sensor 51 with ambient air. For improving the flow, an air exit opening 55 is provided in the box-type protective hood 52, connected to radius member 57, arranged in the area of the interior end of the central tube-type part 54 and provided with a protective cap or cover 56 extending inclinedly toward the outside and toward the front end in the direction of the free end of the NTC thermal sensor 51.

While a specific embodiment of the invention has been shown and described in detail to illustrate the application of the principles of the invention, it will be understood that the invention may be embodied otherwise without departing from such principles.

What is claimed is:

1. An ultrasonic measuring device for determining motion parameters of moving bodies, comprising:
   a housing;

first and second ultrasonic transducers, each ultrasonic transducer including a sound generator or a sound receiver positioned between a front vibrating element and a rear vibrating element, each of said first and second ultrasonic transducers being positioned within said housing with said front vibrating element positioned adjacent a housing sound opening; and, transducer support means for connecting each of the first and second ultrasonic transducers to said housing, said transducer support means including front and rear support elements for each of said first and second ultrasonic transducers, said support elements each being connected to said housing and being bent in a meander-type manner, each said front support element being positioned adjacent a corresponding one of said sound openings in said housing and being slidably mounted to one of said front vibrating elements.

2. An ultrasonic measuring device according to claim 1 wherein each support element is formed of a first sleeve-type wall portion and a second sleeve-type wall portion, said first and second sleeve-type wall portion extending substantially parallel to a longitudinal axis of the corresponding ultrasonic transducer and a disk-type wall portion forming a radial connection between said sleeve-type wall portions, each of said sleeve-type wall portions having support flanges adjacent free ends of said sleeve-type wall portions.

3. An ultrasonic measuring device according to claim 2, wherein each said sleeve type wall portion is formed to have a thin-walled thickness.

4. An ultrasonic measuring device according to claim 2 wherein each of said support flanges includes a circumferential recess for receiving an O-ring.

5. An ultrasonic measuring device according to claim 1 wherein said transducer support means includes a cylindrical screw and nut arrangement, said screw connecting one of said sound generator and said sound receiver and corresponding front vibrating element and rear vibrating element, a cup spring arrangement positioned between the nut and a corresponding rear vibrating element for exerting a biasing force on one of said sound receiver and said sound generator.

6. An ultrasonic measuring device according to claim 1, wherein said housing includes two through-openings extending under an acute angle relative to each other, said sound openings being enlarged toward the exterior of said housing, the opening having a defined radius.

7. An ultrasonic measuring device according to claim 5 wherein the free end of the cylindrical screw of each ultrasonic transducer is screwed into an end piece, a support flange of a corresponding support element being clamped between said end piece and a support disk, said support disk resting against said nut.

8. An ultrasonic measuring device according to claim 7 wherein said end piece of said transducer bears on a cooling member, each of said end pieces being surrounded by a bellows arrangement extending between an interior edge of the cooling member and the support element.

9. An ultrasonic measuring device according to claim 6 wherein an end piece of said transducer is supported by a cap closing the through opening of said housing, a heating element being positioned adjacent said cap to heat the corresponding transducer.

10. An ultrasonic measuring device according to claim 9 wherein said heating element is a PTC heating element.

11. An ultrasonic measuring device according to claim 1 wherein said housing includes a sidewall, a protective hood for an NTC thermal sensor being attached to said sidewall, to provide a space surrounding the NTC thermal sensor for flow of ambient air about the NTC thermal sensor.

12. An ultrasonic measuring device according to claim 11 wherein said NTC thermal sensor is provided having a free end with a sound-dampening unit.

13. An ultrasonic measuring device according to claim 12 wherein said NTC thermal sensor includes a protective hood which is formed in a box-type manner and provided with a tube-shaped central part, said tube-shaped central part receiving the NTC thermal sensor, said box-type protective hood having an interior end with an exit opening with an inclined cover.

14. An ultrasonic measuring device for determining motion parameters of moving bodies; comprising:

an ultrasonic sensor housing;

a first ultrasonic transducer including a sound generator positioned between a first ultrasonic transducer front vibrating element and a first ultrasonic transducer rear vibrating element, said first ultrasonic transducer being positioned within said housing with said first ultrasonic transducer front vibrating element positioned adjacent a first housing sound opening;

a second ultrasonic transducer including a sound receiver positioned between a second ultrasonic transducer front vibrating element and a second ultrasonic transducer rear vibrating element, said second ultrasonic transducer being positioned within said housing with said second ultrasonic transducer front vibrating element positioned adjacent a second housing sound opening; and transducer support means for connecting said first ultrasonic transducer and said second ultrasonic transducer to said housing, said transducer support means including first and second front support elements and first and second rear support elements for connecting front and rear portions of said first and second ultrasonic transducers to said housing, said support elements each being connected to said housing, and extending in a direction and being bent back in an opposite direction to form a substantially U-shaped support, each of said first and second front support element being positioned adjacent a corresponding one of said first and second sound openings and having an end slidably mounted to a corresponding one of said first ultrasonic transducer and second ultrasonic transducer front vibrating elements.

* * * * *